Nov. 28, 1967     J. A. FLEMING     3,355,581

TAIL PIPE ILLUMINATOR

Filed Aug. 5, 1965

JERRY A. FLEMING
INVENTOR.

BY

ATTORNEYS

United States Patent Office 3,355,581
Patented Nov. 28, 1967

3,355,581
TAIL PIPE ILLUMINATOR
Jerry A. Fleming, Box 116, Oroville, Wash. 98844
Filed Aug. 5, 1965, Ser. No. 477,428
7 Claims. (Cl. 240—8.3)

ABSTRACT OF THE DISCLOSURE

A tail pipe illuminator device for the exhaust pipe of a vehicle which creates a glowing effect about the end of a tail pipe. Light rays are directed into the exhaust gas stream adjacent the end of the tail pipe. A convex lense is mounted in the wall of the exhaust pipe near the terminal end to allow light rays to enter the gas stream. A light source such as an electric light bulb is mounted on the tail pipe and surrounded by a housing so as to direct the light rays through the lens into the gas stream.

Background of the invention

The present invention relates in general to illumination devices and more particularly to a device for illuminating the exhaust gases from an exhaust pipe such as the tail pipe of a motorcycle, automobile or the like in such a manner as to cause the gases to glow about the end of the pipe.

According to the present invention, a light source is located so as to direct light rays into the exhaust gas stream in such a manner as to cause the light rays to be diffused by the gas particles resulting in a glowing effect about the end of the tail pipe. The light source may be energized from the electrical system of the vehicle or other device and in the case of a road vehicle, the light source may be energized in the same manner as a brake light thus providing an improved safety feature not present in the prior art.

The primary object of the present invention is, therefore, to provide an illuminating device for the exhaust gas stream of a motor vehicle or the like whereby light rays are diffused through the gas stream to cause a glowing effect about the end of the exhaust pipe.

Another object of the present invention is to provide a device of the character described whereby an electrical light source is located so as to direct light rays into the gas stream adjacent the end of the tail pipe of a motor vehicle.

A further object of the present invention is to provide a device of the character described which may be mounted directly in the wall of an exhaust tail pipe or tail pipe extension.

The means by which the foregoing objects and other advantages, which will be apparent to those skilled in the art are accomplished, are set forth in the following specification and claims and are illustrated in the accompanying drawings dealing with a preferred embodiment of the invention. Reference is now made to the accompanying drawings in which:

Figure 1:
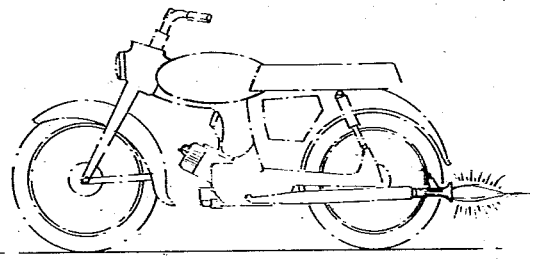
FIG. 1 illustrates one application of a tail pipe illuminator to a motorcycle.
Figure 2:
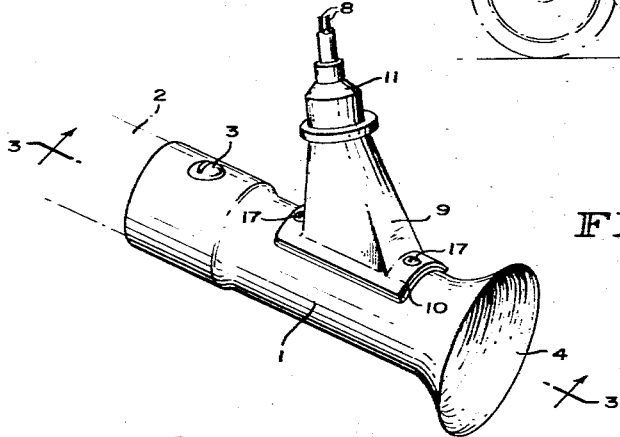
FIG. 2 is a perspective view of a tail pipe extension embodying the present invention.

Referring now to the drawings, wherein like reference numerals indicate identical parts in the various views, FIG. 1 illustrates the device as applied to the tail pipe of a motorcycle by way of illustration only and it will be understood that the device may be applied to the exhaust pipe of any motor vehicle or any other motorized unit having an exhaust pipe for the expulsion of exhaust gases. Although the present embodiment of the invention is illustrated as being incorporated in a tail pipe extension, it will also be understood that the device may be mounted directly to the end section of any exhaust pipe. In the embodiment illustrated, the extension unit comprises a hollow extension pipe 1 which may be suitably affixed to an exhaust pipe 2 in any suitable manner such as attaching screws 3 which may constitute a cross bolt, set screw or the like. In most instances, it is preferable to use a detachable extension pipe such as the pipe 1 which may be easily adapted for attachment to various sizes and types of existing exhaust pipes. It will also be noted that the extension pipe 1 is provided with a flared terminal end 4 which is used on many conventional exhaust pipes to facilitate the escape of the exhaust gases.

Figure 3:
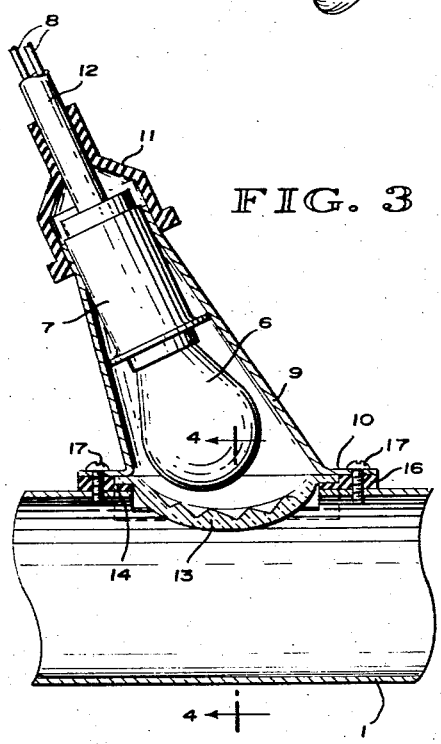
FIG. 3 is a cross sectional view taken along lines 3—3 of FIG. 2.

As seen in FIG. 3, the light source is provided by a conventional electric lamp or light bulb unit 6 carried in the socket 7 and energized by the electrical lead wires 8 which may be connected to the electrical system of a vehicle or other device. As aforementioned, the lamp 6 may be connected to the electrical system of a vehicle in the same manner as a brake light if desired so as to provide a brake signal or may be connected so as to glow constantly in the same manner as a conventional tail light. The socket 7 is mounted in the upper end of a lamp housing having an elongated body portion 9 which is adapted to receive the lamp and socket, as illustrated, with the bottom end of the elongated body 9 being open for the passage of light rays from the lamp. The socket 7 may be held in position by friction or may be otherwise detachably mounted. The periphery of the bottom end of the body 9 includes a rectangular flange 10 which is of an arcuate configuration so as to conform to the curvature of the tail pipe extenison 1. A protector cap 11 of conventional design is fitted to the upper end of the lamp housing 9 and surrounds the upper end of the housing as well as the covering 12 of the electrical leads. The cap 11 may be made of rubber or plastic or other flexible material to provide a moisture and dust cover for the socket mounting.

Figure 4:
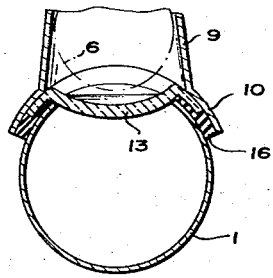
FIG. 4 is a cross sectional view taken along line 4—4 of FIG. 3.

As seen in FIGS. 3 and 4, the tail pipe extension 1 is provided with a rectangular opening for the reception of a convex lens 13 which projects a slight distance into the pipe and is seated in a recessed portion of an insulating gasket 16 which surrounds the opening in the tail pipe. The lens 13 may be made of any translucent or transparent material such as glass or specially adapted plastics which will withstand the relatively high temperatures of exhaust gases in the pipe without deforming or melting. It will also be noted that the opening in the pipe 1 is located closely adjacent the end of the tail pipe in such a manner as to allow the lens 13 to be conveniently cleaned from time to time by merely wiping with the fingers or with a small cloth.

The recessed gasket 16 may be made from rubber, cork or any other material which will act as a heat insulator between the wall of the pipe 1 and the lamp housing 9. The housing 9 is assembled on top of the gasket 16 by bolts or metal screws 17 which clamp the housing to the pipe and retain the lens 13 in position as shown in FIG. 3. With this arrangement the lamp 6 is maintained away from the stream of hot exhaust gases and the housing 9 is thermally insulated from the surface of the tail pipe with the lens 13 also acting as a heat insulator for the lamp. The lamp and socket are thus protected from the high temperatures of the tail pipe section.

The lamp housing may be easily assembled and disassembled for replacing the lamp by merely removing the screws 17 to disconnect the housing from the tail pipe and then removing the socket 7 and the lamp through the bottom end of the housing. The mounting structure also provides easy access for removal or replacement of the lens 13. In practice it has been found that the illuminator unit may be adapted for any conventional type of motorcycle or automotive tail pipe without alteration of existing structures. By virtue of the fact that the light rays from the lamp are diffused in all directions by the exhaust gas particles, an unusual glowing effect is produced at the end of the tail pipe. The novel glowing effect not only produces a pleasing appearance but improves the effectiveness of tail end lighting for motor vehicles by producing a soft glow over a larger area than is possible with conventional tail light devices.

From the foregoing description it will be appreciated by those skilled in the art that the present device provides significant improvements in automotive tail lighting and tail pipe illuminators. The arrangement and types of structural components utilized within the invention may be subjected to numerous modifications well within the purview of the invention and applicant intends only to be limited to a liberal interpretation of the specification and appended claims.

Having thus described the invention, what is claimed as new and desired to be secured by Letters Patent is:

1. In combination with an exhaust gas pipe carrying a moving stream of exhaust gases and having a terminal outlet for expelling the gases, said pipe having an opening in the wall thereof closely adjacent said outlet, an illuminator device comprising in combination; a lens mounted in said opening, a light source, and means to mount said light source adjacent said lens to direct light rays therethrough into the exhaust gas stream, whereby light rays are diffused by the exhaust gas particles as they are expelled.

2. In combination with an exhaust gas pipe carrying a moving stream of exhaust gases and having a terminal outlet for expelling the gases, said pipe having an opening in the wall thereof closely adjacent said outlet, an illuminator device comprising in combination; a lens having a convex portion extending into said opening, a light source, housing means for mounting said light source adjacent said lens and directing the light rays therefrom through said lens into the exhaust gas stream, and heat insulation means for insulating said housing from said pipe.

5. An exhaust gas tail pipe illuminator comprising: a hollow tail pipe extension, means to detachably fix said extension on the outlet end of the tail pipe of a motor vehicle exhaust system, a light source, housing means for mounting said light source, said housing having an opening therein for the passage of light rays, means forming an opening in said extension adjacent the outlet end thereof, a convex lens mounted in said opening and protruding into said extension, means to mount said housing on said extension with the light source adjacent said lens, and heat insulating gasket means located between said housing and said extension, whereby light rays are directed into the exhaust gas stream and diffused therethrough as the gas particles are expelled.

4. In combination with an exhaust gas pipe, an illuminator device comprising: a light source, housing means for mounting said light source, said housing having an opening therein for the passage of light rays, means forming an opening in said pipe adjacent the outlet end thereof, a convex lens mounted in said opening and protruding into said pipe, means to mount said housing on said pipe with the light source adjacent said lens, and heat insulating gasket means located between said housing and said pipe, whereby light rays are directed into the exhaust gas stream and diffused therethrough as the gas particles are expelled.

5. The device according to claim 4 wherein said exhaust gas pipe comprises the tail pipe of a motor vehicle exhaust system, said lens being formed from heat resistant plastic material and said light source comprises an electric lamp energized by the electrical system of said vehicle.

6. In combination with an exhaust gas pipe; an illuminator device comprising: an elongated housing having one end thereof open for passage of light rays, a light source mounted in said housing, means to energize said source, means forming an opening in said pipe adjacent the outlet end thereof, a lens having a convex portion, a heat insulating gasket surrounding said opening and including a recess about the inner periphery thereof, said lens being mounted with the periphery thereof located in said recess and the convex portion thereof extending into said opening, and means to mount said housing with the open end thereof on said gasket, said light source being maintained spaced from said opening and heat insulated from the tail pipe, whereby light rays are directed into the exhaust gas stream and diffused therethrough as the gas particles are expelled.

7. The device according to claim 6 wherein said exhaust gas pipe comprises the tail pipe of a motor vehicle exhaust system, said lens being formed from heat resistant plastic material and said light source comprises an electric lamp energized by the electrical system of said vehicle.

References Cited

UNITED STATES PATENTS

| 1,540,476 | 6/1925 | Hoffman et al. | 240—46.53 |
| 2,770,713 | 11/1956 | Sears | 240—7.1 |
| 3,225,188 | 12/1965 | Le Vantine | 240—41.1 |

NORTON ANSHER, *Primary Examiner.*

D. L. JACOBSON, *Assistant Examiner.*